(12) United States Patent  
Manjunath

(10) Patent No.: US 8,806,574 B2
(45) Date of Patent: Aug. 12, 2014

(54) SYSTEM AND METHOD FOR POLICY CONFORMANCE IN A WEB APPLICATION

(75) Inventor: Geetha Manjunath, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 104 days.

(21) Appl. No.: 13/253,731

(22) Filed: Oct. 5, 2011

(65) Prior Publication Data

US 2013/0091536 A1     Apr. 11, 2013

(51) Int. Cl.
*H04L 29/00*     (2006.01)
*H04L 29/06*     (2006.01)

(52) U.S. Cl.
CPC ................................ *H04L 63/10* (2013.01)
USPC ............ 726/3; 726/1; 726/22; 726/26; 726/27

(58) Field of Classification Search
None
See application file for complete search history.

(56) References Cited

U.S. PATENT DOCUMENTS

| | | |
|---|---|---|
| 6,862,583 B1 | 3/2005 | Mazzagatte et al. |
| 6,877,007 B1 | 4/2005 | Hentzel et al. |
| 7,248,693 B1 | 7/2007 | Tretter et al. |
| 7,313,822 B2 * | 12/2007 | Ben-Itzhak ...................... 726/24 |
| 7,363,368 B2 | 4/2008 | Paulin |
| 7,409,452 B2 | 8/2008 | Ragnet et al. |
| 7,657,844 B2 | 2/2010 | Gibson et al. |
| 8,146,135 B2 * | 3/2012 | Waissbein et al. ................. 726/1 |
| 8,296,736 B2 | 10/2012 | Jones et al. |
| 2002/0023057 A1 | 2/2002 | Goodwin et al. |
| 2002/0063892 A1 | 5/2002 | Tsukada |
| 2002/0078160 A1 | 6/2002 | Kemp et al. |
| 2002/0138564 A1 | 9/2002 | Treptow et al. |
| 2002/0152244 A1 | 10/2002 | Dean et al. |
| 2003/0103226 A1 | 6/2003 | Nishio |
| 2003/0154289 A1 | 8/2003 | Williamson et al. |
| 2003/0217144 A1 | 11/2003 | Fu et al. |
| 2004/0020389 A1 | 2/2004 | Holmstead et al. |
| 2004/0021905 A1 | 2/2004 | Holmstead et al. |
| 2004/0080772 A1 | 4/2004 | Snyders |
| 2004/0111488 A1 | 6/2004 | Allan |
| 2004/0135805 A1 | 7/2004 | Gottsacker et al. |
| 2004/0174561 A1 | 9/2004 | Fukunaga et al. |
| 2005/0088684 A1 | 4/2005 | Naito et al. |
| 2005/0091536 A1 | 4/2005 | Whitmer et al. |
| 2005/0099647 A1 | 5/2005 | Aichi |

(Continued)

FOREIGN PATENT DOCUMENTS

| | | |
|---|---|---|
| EP | 0401975 | 12/1990 |
| GB | 2347766 | 9/2000 |

(Continued)

OTHER PUBLICATIONS

Erlingsson et al., End-to-end Web Application Security, Microsoft Research, 2007.*

(Continued)

*Primary Examiner* — Minh Dinh

(57) ABSTRACT

A method and system may analyze a script file of a web application, the script file representing actions of a task performed in conjunction with a web service, to determine whether the actions conform to policy criteria. The method and system may determine as restricted any of the actions which do not conform to the policy criteria. The method and system may execute the script file without the restricted actions to reproduce the task in response to a request by a user.

20 Claims, 4 Drawing Sheets

(56) References Cited

U.S. PATENT DOCUMENTS

| | | | |
|---|---|---|---|
| 2006/0005132 | A1 | 1/2006 | Herdeg, III |
| 2006/0143684 | A1 | 6/2006 | Morris |
| 2006/0155807 | A1 | 7/2006 | Loupia et al. |
| 2006/0259590 | A1 | 11/2006 | Tsai et al. |
| 2007/0050844 | A1 | 3/2007 | Lebel |
| 2007/0136809 | A1* | 6/2007 | Kim et al. ............... 726/22 |
| 2007/0159504 | A1 | 7/2007 | Lin et al. |
| 2008/0083012 | A1* | 4/2008 | Yu et al. ............... 726/1 |
| 2008/0120257 | A1 | 5/2008 | Goyal et al. |
| 2008/0126931 | A1 | 5/2008 | Kojima et al. |
| 2008/0273223 | A1 | 11/2008 | Tsai et al. |
| 2009/0083251 | A1 | 3/2009 | Sahasrabudhe et al. |
| 2009/0089404 | A1 | 4/2009 | Guo |
| 2009/0138937 | A1* | 5/2009 | Erlingsson et al. ............... 726/1 |
| 2009/0144625 | A1 | 6/2009 | Muller et al. |
| 2009/0222727 | A1 | 9/2009 | George et al. |
| 2010/0095208 | A1 | 4/2010 | White et al. |
| 2010/0125802 | A1 | 5/2010 | Huslak et al. |
| 2011/0026073 | A1* | 2/2011 | Wu ............... 358/1.15 |
| 2011/0289489 | A1 | 11/2011 | Kumar et al. |
| 2012/0096148 | A1 | 4/2012 | Manjunath et al. |
| 2012/0198422 | A1 | 8/2012 | Huang et al. |
| 2012/0271960 | A1 | 10/2012 | Geetha et al. |

FOREIGN PATENT DOCUMENTS

| | | |
|---|---|---|
| IN | 1402/CHE/2011 | 4/2011 |
| WO | WO/2010/140160 | 12/2010 |
| WO | WO-2012066091 A1 | 5/2012 |

OTHER PUBLICATIONS

Jim et al., Defeating Script Injection Attacks with Browser-Enforced Embedded Policies, ACM, 2007.*

Nguyen-Tuong et al., Automatically Hardening Web Application Using Precise Tainting, 2005.*

Haldar et al., Dynamic Taint Propagation for Java, IEEE, 2005.*

Bisht et al., XSS-Guard: Precise Dynamic Prevention of Cross-Site Scripting Attacks, Springer-Verlag, 2008.*

U.S. Appl. No. 13/157,313, filed Jun. 10, 2011, Manjunath et al.

Dudley, Richard, "Automatically Printing Crystal Reports in ASP.NET," avaitable Mar. 25, 2005, <http://web.archive.org/web/20050325094155/http://aspalliance.com/articleViewer.aspx?ald=509&pid=-1>.

European Patent Office, Extended European Search Report, issued for European App. No. 09845468.9, dated Apr. 2, 2013, 8 pages.

International Searching Authority, International Preliminary Report on Patentability, issued for International App. No. PCT/IN2009/000327, mailed Dec. 6, 2011.

International Searching Authority, International Search Report & Written Opinion, issued for International App. No. PCT/IN2009/000327, mailed Mar. 2, 2011, 12 pages.

Tyler, "Automate Your Web Browser Actions by Selenium," May 27, 2009, found at http://voices.yahoo.com/automate-web-browser-actions-selenium-3356542.html.

* cited by examiner

SYSTEM AND METHOD FOR POLICY CONFORMANCE IN A WEB APPLICATION

BACKGROUND

Many web tasks may be completed using web applications. A web application may be, for example, a program executed using communications via the Internet (the "world wide web"). A web application may operate by having a server execute an application on the server and also provide code to a remote user computer which may be executed by a browser, hardware, or other module or application. A web application may, thus, be executed on more than one computer at the same time. Some web applications (e.g., apps), widgets, or appliances may simplify complicated and/or multi-step web tasks or interactions by reducing the amount of input and interaction needed from a user. Some web applications may, for example, be created by programming by browsing (e.g., programming-by-browsing). Programming by browsing may allow users to generate web applications by completing a series of steps using a web browser (e.g., using a web browser as it would normally be used). The series of steps may be recorded and used to create a web application, which the user may use in the future to complete the same or similar steps. A web application may, for example, in response to a press of a button, open a website, download a form, fill out the form, and print the form. A web application may, for example, be a Tasklet, which may be invoked by different devices to perform the user actions at a later time. A Tasklet may, for example, model a web interaction, series of web interactions, or other actions to accomplish a task (e.g., navigating to websites, entering information, downloading content, printing content, and/or other interactions or actions).

Web applications may, for example, be stored in a remote server, on a user's computer or device, or in another location. Web applications may also interact with other hardware (e.g., may send commands to a printer), websites (e.g., may access websites), software, and other systems. Web applications may, for example, be used (purposefully or inadvertently) to print objectionable content on a remote printer; access objectionable web content; and/or perform actions that may be detrimental to servers, hardware, software, and/or systems.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
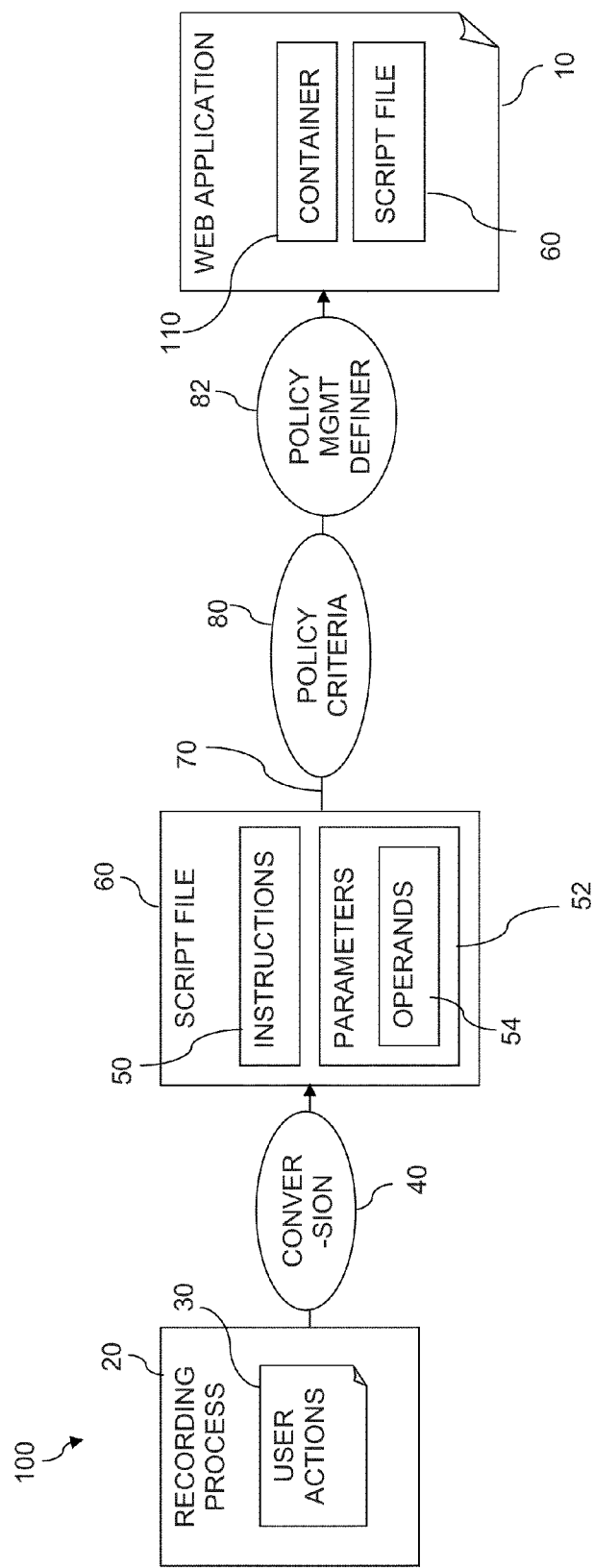
FIG. 1 is a schematic diagram of a system for policy conformance when used with a web application according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. It will however be understood that the present invention may be practiced without these specific details. In other instances, certain methods, procedures, and components have not been described in detail so as not to obscure the present invention.

Unless specifically stated otherwise, as apparent from the following discussions, it is appreciated that throughout the specification discussions utilizing terms such as "processing," "computing," "storing," "determining," "evaluating," "calculating," "measuring," "providing," "transferring," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Web applications, applications, apps, simple Internet print applications (SIPs), simple Internet print Lets (SIPLet), Tasklets or widgets may be used to perform actions of a task performed in conjunction with a web service, Internet related tasks (e.g., web based printing operations), and other tasks. Actions of a task performed in conjunction with a web service may be, for example, actions or interactions with interactive websites (e.g., entering information into input fields or forms, clicking hyperlinks, responding to prompts, downloading information, etc.), passive websites (e.g., copying information from a text based website, etc.), hardware modules (e.g., interacting with a printer API module), other web applications, or other web related modules. A web application may, for example, be used to perform a series of steps on a web browser by controlling or providing input to the web browser, simulating a user's input and control. The web browser in turn may execute an Internet based or web application and interact with a remote server or computer via the Internet. The series of steps may, for example, be performed in response to a push of a button or other input by a user.

A web application, app, or widget may be or may include a script file or other type of file representing actions of a web-related task or task performed in conjunction with a web service. Web applications may be created by programming, created by a user without programming (e.g., programming-by-browsing, where a user's actions and inputs are recorded and converted to a program), or created using other methods. A web application may, for example, be created by programming using Java, JSP, Servlets, AJAX, Javascript, Flex or a similar programming language.

A web application may, for example, be generated without programming using an authoring tool (e.g., a web browser plug-in). A web application generated without programming may be a Tasklet, simple Internet print Let (SIPLet), or other widget. When executed by a user, the authoring tool may record and analyze a user's actions performed in conjunction with a web service or when operating or interacting with a web-browser. The user's actions may include interactions with web-pages, hardware (e.g., a printer or other devices), web applications, servers (e.g., cloud services), modules, or other devices. For example, a user's actions may include multiple steps (e.g., accessing a website, downloading content, printing a document, etc.) to accomplish a web task (e.g., filling out and printing a tax form). The authoring tool may record the user actions along with the web-pages (e.g. as indicated by uniform resource locators (URLs)), hardware, web applications, servers, modules and/or devices with which the user interacts. The actions may be captured or represented as an instruction set and parameters and/or other data in a script file representing the semantics of the user's actions. The instruction set representing the user actions may be a series of operation codes representing each action or instruction and associated operands representing the parameters of each action. The script file may, for example, be created using a task template language (TTL) or similar scripting language.

The web application may be stored on a server (e.g., an application repository) or other location. The web application may be executed by the user, downloaded to hardware, or otherwise accessed at any time to reproduce the web task. While performing a web task, web applications may interact with software (e.g., web-sites and cloud services), hardware (e.g., a web-connected printer), other web applications, and/or other devices. An embodiment may help ensure that web applications function securely; do not compromise software, hardware, web applications, and other devices; and are not used to access, print, or store objectionable content. A policy conformance enforcement, or compliance method or system may ensure that a web application complies with, adheres to, or does not violate predefined policy criteria or conformance policies.

According to some embodiments, policy conformance may occur or may be necessary when the web application is created, when the application is downloaded to a device or hardware, when the application is executed by a user at a device or hardware, or at any other time. Policy conformance may occur or may be necessary when the web application is created by, for example, restricting or limiting certain types of user actions of a web-related task including navigation (e.g., limiting access to predefined websites), download (e.g., limiting downloads to certain file types), input, and other types of actions. User actions may be limited by analyzing the instruction set and associated parameters in the web application script file to determine whether any of the instructions or parameters violate or do not conform to predefined policy criteria or conformance policies.

A SIPLet, a type of web application, may, for example, be limited to printing operations. Upon creation of a SIPLet, a user may, therefore, be limited to web-browser actions for printing acceptable content from allowed websites on a web-connected printer. A user may, therefore, be limited to predefined instructions and parameters. For example, only predefined instructions (e.g., go to website, open form, etc.) and predefined parameters (e.g., predefined web addresses) may be allowed. If in creating a SIPLet a user, for example, attempts to access a blocked website; download unacceptable content; perform an action which may harm hardware, modules, web applications, or other devices, the user the authoring tool may not be allowed to create the SIPLet. The user may also receive a prompt informing them that the SIPLet was not successfully created and reasons why the SIPLet was not successfully created may be output to a user or other device.

According to some embodiments, policy conformance may occur by limiting or restricting actions when a web application is executed on a user's device, a remote server (e.g., in a cloud operation), hardware (e.g., a printer), or other device. A web application may include a web application container which may, for example, allow or disallow certain actions in the instruction set (e.g., the operation code and associated operands) in a web application script file. A policy enforcement module may, in some embodiments, analyze each instruction and associated parameter representing user actions, or other element of the web application script file at the time of execution. If elements of the instruction set in the script file do not conform to the policy criteria, the web application or non-conforming instruction set(s) and parameter(s) may be limited or restricted. The allowed and disallowed actions, rules, filters, and policies may be defined based on the hardware, modules, web applications, or other devices with which the web application interacts.

Policy conformance or enforcement may, for example, occur when an application is deployed from a server to a device, hardware, or module. A policy conformance module may, for example, prior to or during deployment of an application to hardware, device, or module, analyze a web application script file instruction set and parameters. The instruction set and parameters may be analyzed to ensure that the instructions and parameters conform to the hardware functions. Custom policies (e.g., filters, rules, or other policies) may, therefore, be defined for each device, system, or module interacting with the web application. A web application may, for example, be restricted from performing certain actions (e.g., prompting user input on the device) when used with a type of hardware (e.g., a type of printer), but may not be restricted from performing the actions when used with other hardware (e.g., a different type of printer).

Embodiments of the present invention may be particularly useful in facilitating smooth operation of web applications used in conjunction with web-connected printers (e.g., simple Internet print (SIP) applications) by ensuring that the proper file types are sent to the web-connected printer, no objectionable content is printed, and that the web-connected printer is not overloaded.

FIG. 1 is a schematic diagram of a system for policy conformance when used with a web application according to embodiments of the present invention. A web application creation software development kit (SDK) or system 100 may allow a user to generate a web application 10 without programming (e.g., programming by browsing). A recording process 20 may, for example, be used to record the actions, browser actions, interactions, or steps of user 30 using or interacting with a web service (e.g., a web browser or a program accessible via a web browser).

User actions 30 may, for example, be analyzed by system 100 and converted into semantic form in a conversion process 40. Conversion process 40 may convert user actions 30 into semantic form including a set of instructions or operations 50 and parameters 52 associated with instructions 50. Instructions 50 may represent, describe, or model a user action 30. For example, a HYPERLINK instruction may represent a user action 30 of clicking a hyperlink on a web-page, URL instruction may represent user action 30 of navigating to a web-page, and an INPUT instruction may represent user action 30 of entering information into a form field. Other instructions may include but are not limited to GOTO URL, HYPERLINK, EXTRACT TEXT, EXTRACT HREF, TEXT_INPUT, and SUBMIT. Other instructions and instruction sets may be used.

Parameters 52 may, in some embodiments, represent variables in user actions 30. For example, a user may enter http://www.irs.gov into a web-browser address field. The conversion process 40 may, for example, convert user action 30 into instructions 50 and parameters 52 "URL GOTO=http://www.irs.gov", wherein http://www.irs.gov may be a parameter 52. Other parameters 52 may be used.

Parameters 52 may, for example, correspond to instructions 50 or be independent of instructions 52. Parameters may, in some embodiments, be represented by a variable or operand 54. For example, instruction set 50 and parameter 52 "INPUT John as name" may be converted to "INPUT TLVAR1 as name", wherein TLVAR1 is an operand 54 representing the parameter 52 John.

At the completion of conversion process 40, instruction sets 50 and parameters 52 may, for example, represent user actions in a script file 60. Instruction sets 50 and parameters 52 in script file 60 may, in some embodiments, be optimized based on website information, user information, or other information.

Script file 60, including instructions sets 50 and parameters 52, representing user actions performing a task with a web-service may be analyzed in a policy conformance process 70. A script may, for example, be an automatically generated file created when a user performs actions 30 in conjunction with a web browser (e.g., in a programming-by-browsing operation). During a policy conformance process 70, script file 60 may be analyzed to determine whether the actions (e.g., instructions 50 and parameters 52) representing a web service task conform to or violate policy criteria 80. Instruction sets 50 and parameters 52 may, for example, be analyzed by comparing the instructions 50 and parameters 52 which represent the actions of the user to policy criteria 80. Instructions 50 and parameters 52 which do not conform to the policy criteria may be deemed restricted actions, if instructions 50 and parameters 52 violate policy criteria 80.

Policy criteria 80 may include predefined types of instructions or actions, for example, navigation (e.g., URL, HYPERLINK), input (e.g., TEXT_INPUT, INPUT), download, web-browser actions, or other actions. Policy criteria 80 may also include parameters 52, for example, disallowed websites, input parameter values (e.g., type of input character, blank inputs, etc.), file types (e.g., allowed file types for download), and other parameters or variables. Actions which do not conform to policy criteria 80 may, for example, include entering disallowed input (e.g., entering disallowed information into an input field), entering blank input (e.g., leaving an input field blank), entering a disallowed web address, downloading restricted content (e.g., downloading a restricted file type), uploading restricted content (e.g., uploading a disallowed file type to a web site, printer, or other module), transferring disallowed content (e.g., transferring restricted content to a printer), exceeding a range of input values or parameters (e.g., entering a future date into a past date input field), printing restricted content, exceeding bandwidth or data size restrictions (e.g., transferring a high volume of files or large files), or other actions. Actions which do not conform to policy criteria 80 may, for example, be related to or based on the requirements, features, or parameters of a device (e.g., a printer or other device) used with web application 10. A user may, for example, be restricted from creating a web application to print portable document format (PDF) documents on a printer which does not support PDF printing.

Policy conformance process 70 may, for example, determine that a user action 30 represented by instructions 50 and parameters 52 violates one or more policy criteria 80. The instructions 50 and parameters 52 that violate policy criteria may, for example, be removed from script file 60, deemed or defined as restricted actions, or modified to conform to policy criteria 80. The script file creation or execution process may, in some embodiments, be terminated if instructions 50 and parameters 52 violate one or more policy criteria 80. An error message may, for example, be displayed to the user to notify the user that web application 10 may not be created or executed. For example, a user may desire to create web application 10 that includes the action of accessing an unauthorized web address. System 100 may, in policy conformance process 70, restrict instructions 50 and/or parameters 52 from accessing the website and notify user (e.g., in an error message) that a web application 10 cannot be created which accesses the unauthorized website.

Policy conformance process 70 may, in some embodiments, include policy criteria in a web application container 110. Web application container 110 (e.g., SIPLet container, Tasklet container) may include restrictions, optimizations or strict gate(s) on the web application script file.

During a web application 10 creation operation, a policy management definer 82 may allow a user to define policy criteria. Policy criteria may, for example, be applicable to web application script file 60, web application container 110, and/or other component of web application 10. Policy management definer 82 may, for example, allow a user to define allowed and disallowed actions (e.g., allowed and disallowed websites, file types, navigation actions, download actions, input actions, etc.) which may be performed by a user executing a web application 10. For example, if a user wishes to restrict web application 10 from accessing certain websites, policy management definer 82 may be used to create a list of allowed and disallowed websites in web application container 110.

According to some embodiments, policy conformance process 70 may be performed at another stage in web application creation process 100, after web application 10 is created, when web application 10 is executed, when web application 10 is deployed, or at another time.

Other systems and processes may be used when generating web application 10. Script file 60 may, for example, be optimized for faster execution of web actions.

Figure 2:
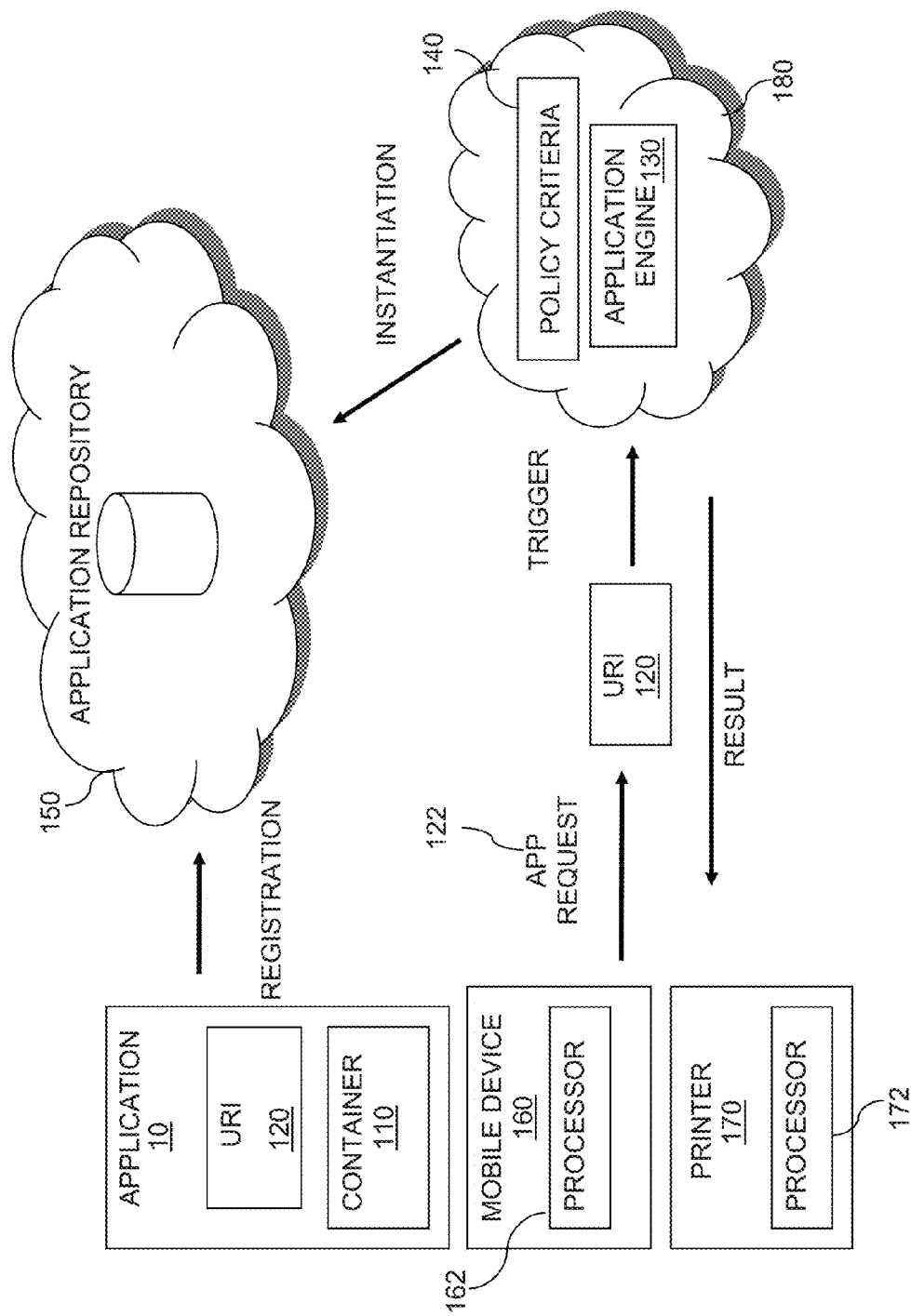
FIG. 2 is a schematic diagram of a web application life cycle according to embodiments of the present invention.

FIG. 2 is a schematic diagram of a web application life cycle according to embodiments of the present invention. A web application creation software development kit (SDK) or system 100 may include processors 102 and memory 104. Memory 104 and/or processors 102 may, for example, be used to create, generate, and/or store a web application 10 or for other operations. A web application 10 may include a web application container 110. Web application container 110 may control web application 10 execution behavior.

Web application 10 may, for example, be stored, located in, or registered to a web application repository 150 and assigned a uniform resource identifier (URI) 120. Web application repository 150 may be hosted by a user or third party. The user or third party may define certain policy criteria for web applications stored in repository 150. Policy criteria in web application container 110 may, therefore, be defined based on policy requirements of a web application repository 150.

Web application 10 may be downloaded to, installed on, or executed by a web-connected printer 170, hardware, mobile device 160 and/or device (e.g., a computer or other device). Web applications 10 may also, subject to privacy settings or controls, be shared between different printers 170, hardware, devices, and users having access to the web application repository 150. Also, web applications 10 in repository 150 may, for example, be executed in conjunction with or combined with other web applications 10. One print application may, for example, be combined with other print application(s) and be saved as a new web or print application 10. Web applications 10 may also be modified to create a new web application 10. Web applications 10 may interface, function with, and/or interact with other web applications 10.

According to some embodiments, a user may request, invoke, call, or activate 122 a web application 10 on a printer 170, computing or mobile device 160, or other device. Printer 170 may, for example, include one or more processors 172. Computing device 160 may, for example, include one or more processors 162. A user may, for example invoke a web application 10 on a computing device 160 to interact with or send information to a printer 170 associated with computing device 160 or remote from computing device 160. When the user requests or invokes 122 the web application 10 on printer 170, printer 170 may request or trigger an instantiation of URI 120 by application or execution engine 130. Application engine 130 may be located or reside on (e.g., be stored on and executed by) a server device, be part of a collection of server devices operating as a server system (e.g., a cloud computing infrastructure or network), or physical memory 180. Application engine 130 may include a processor and may retrieve the script file for web application 10 associated with the URI 120 and cause the task associated with web application 10 to be executed. If web application 10 requires input from user, execution engine 130 may prompt the user to provide the input. For example, the task associated with web application 10 may involve the user providing information to fill out a form (e.g., personal information on a tax form), web addresses, or other information. Execution engine 130 may execute the script file associated with the web application 10 and in doing so, may provide the information to web page(s), devices or modules associated with the web application 10 task.

According to some embodiments, execution engine 130 may ensure that a web application 10, execution of web application 10, user input associated with execution of web application 10 conforms to predetermined policy criteria 140. Execution engine 130 may ensure execution conforms to policy criteria 140 using web application container 110. Web application container 110 may interpret the different instructions in the script file 60 corresponding to the web application 10 and check the policy conformance of every instruction 50 by validating operands 54 and/or parameters 52. The type of validation may, for example, depend upon the operation code (e.g., opcode) type. For example, a GOTO URL instruction may require that the parameter 52 (e.g., the URL of a webpage) conforms to allowed websites. Execution engine 130 may also invoke modules included in web application container 110. Policy criteria 140 may, for example, be governed by the host of application repository 150. Policy criteria 140 may, for example, include allowed and/or disallowed web pages, information, actions, input, and/or information.

Policy criteria 140 may, for example, include filters, gates (e.g., a strict gate), or other criteria. Execution engine 130 may determine as restricted any of the actions in web application script file 60 which do not conform to the policy criteria 140. Execution engine 130 may, for example, execute script file 60 without the restricted actions to reproduce the task in response to the request by a user.

Printer 170, mobile device 160 or other hardware may, for example, include policy criteria for web applications 10, users and hardware which interface with printer 170. Printer 170 may, for example, only print predefined file types (e.g., grayscale pdf's, low resolution word documents, etc.) and not other file types (e.g., high resolution RAW images). Printer 170 may, for example, not allow input at the printer 170 (e.g., printer may not have a keyboard).

Figure 3:
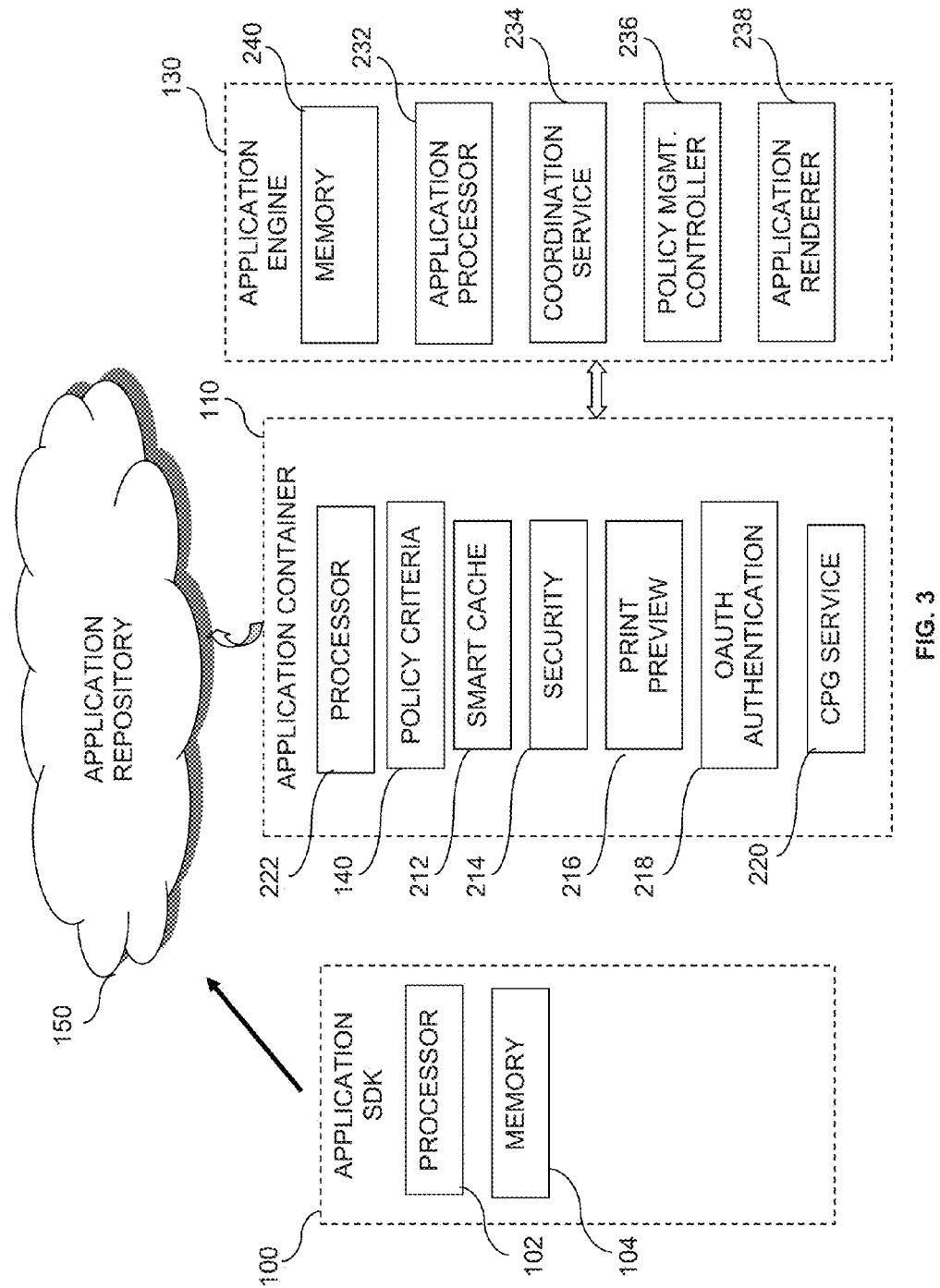
FIG. 3 is a schematic diagram of web application function modules according to embodiments of the present invention.

FIG. 3 is a schematic diagram of web application function modules according to embodiments of the present invention. A web application 10 may, for example, be created using a web application creation system or software development kit (SDK) 100.

Web application container 110 (e.g., SIPLet container, Tasklet container) may be a module in web application 10. Web application container 110 may control web application 10 execution behavior and may include policy criteria 140. The policy criteria may include restrictions or optimizations, and/or strict gate(s) web application script 60. Script file 60 may be analyzed to determine whether the actions (e.g., instructions 50 and parameters 52) conform to policy criteria in web application container 110 by comparing instructions 50 and parameters 52 in script file 60 to policy criteria in a web application container 110. Any actions which do not conform to the policy criteria in the web application container may be deemed restricted.

Web application container 110 may, for example, include strict gate policy criteria. Strict gates in a web application container 110 may, for example, restrict actions in the execution of web application 10. For example, in a web application 10 to fill out a form, a strict gate may ensure that the form is not completed with more than two or another number of blank fields or input boxes. Strict gates may, therefore, be used to ensure web application 10 functions properly, thereby providing a good user experience. Strict gates may, for example, be applied to limit or restrict type(s) of websites web application 10 uses and the type of end result or output web application 10 provides. For example, strict gates may restrict a web application 10 from accessing websites with certain types of code, with taboo content, or other predefined types of websites. As a further example, strict gates may limit or restrict web application 10 from outputting predefined file types.

Web application container 110 may, for example, control policy enforcement when web application 10 is executed by a printer, by a user device, by another web application, or by other hardware. Web application container 110, for example, may include modules, and policy criteria may be enforced by each of the modules.

Web application container 110 may, for example, include a smart cache 212 or other proxy caching module. Smart cache 212 may store information related to web application 10 steps or tasks (e.g., print file information). The information stored in smart cache 212 may be repeatedly used by web application 10. Policy criteria may be enforced within smart cache 212 by ensuring that other web applications and resources do not access, corrupt and/or use web application 10 cache resources. Policy criteria may be enforced to disable a cache (e.g., smart cache 212) if a web application 10 uses private information (e.g., credit card information, passwords, etc.).

Web application container 110 may, in some embodiments, include a security module 214. Security module 214 may, for example, enforce policy criteria to ensure, for example, that predefined web application information (e.g., personal information, web application executable code, etc.) is not accessed by other web applications 10 or other parties (e.g., users). Security module 214 may, for example, impose additional conditions or requirements on the authentication of printer 170 (e.g., using a user tag, metadata or other information) used with or executed by web application 10. Security module 214 may, in some embodiments, disallow, restrict or limit certain web applications 10 from being executed from a printer 170. This may be useful, for example, to provide or enforce a differentiation between premier web applications 10 (e.g., premier applications, paid applications, etc.) and free web applications 10.

Web application container 110 may include a print preview module 216. Print preview module 216 may, for example, in a printing web application 10 generate a preview depicting a print-out of a website, file (e.g., picture file, portable document format (pdf) file, word processor files, etc.), or other information. Policy criteria may be enforced in print preview module 116 by ensuring that only predefined file types are used with a printer 170 or other hardware.

Web application container 110 may include an Oauth or other type of authentication module 218. Oauth module 218 may, for example, authenticate interaction between web application 10 and other web applications 10, users, printer(s), or hardware. Oauth module 218 may, for example, allow a printer or other hardware to access or interact with web application 10 without disclosing identification information.

Web application container 110 may include a cloud printing (CPG) service module 220. CPG service 220 may, for example, in a web printing application 10 (e.g., a SIPLet, SIP, etc.) render an image for printing on a web-connected printer. CPG service 220 may perform other printer service functions including, for example, convert web-browser files to a printer compatible format for printing, controlling print functionality, controlling the print queue and other functions. CPG service 220 may enforce policy criteria by, for example, ensuring the file type printed is support by the web-connected printer used in the web application 10.

Policy enforcement may, for example, occur within the web application container 110 modules including, smart cache 212, security module 214, print preview 216, Oauth or other authentication module 218, CPG module 220, and other modules when web application 10 is executed, deployed to hardware or other device, or at another time. Other methods of policy enforcement may also be used.

According to some embodiments, a web application 10 may be executed as a web service (e.g., in a cloud environment, from a remote server), by an application engine 130. Application engine 130 may, for example, include one or more memory modules 240. Application engine 130 may, for example, include an application executor or processor 232 (e.g., a processor, controller, or similar device). Application processor 232 may execute the steps in web application 10 script file 60, web application container 110, modules included in web application container 110 (e.g., smart cache 212, security module 214, print preview 216, Oauth or other authentication module 218, CPG module 220, and other modules), modules included in application engine 130, other steps or modules.

Application engine 130 may, for example, include a coordination service 234. Coordination service 234 may manage a web application 10 session (e.g., user interaction with web application). Web application 10 sessions may, for example, be disabled if printer 170 is unable to support the features (e.g., required features) used in web application 10 (e.g., cookies). Coordination service 234 may, for example, ensure that potentially malfunctioning or ill-functioning web applications 10 are not deployed on a printer 170 that may not have resources to handle web application 10 operations.

Application engine 130 (e.g., a SIPLet engine) may, for example, include a policy management controller 236. Policy management controller 236 may enforce policy criteria by allowing and/or disallowing predefined actions. Policy management controller 236 may enforce policy criteria when web application 10 is executed and/or when web application 10 is deployed to a device (e.g., printer, mobile device, etc.), web application, or other module. For example, policy management controller 236 may restrict a user or device from accessing predefined restricted web-sites using web application 10. Policy management controller 136 may, for example, restrict a user from printing predefined file types when using web application 10 with a web-connected printer.

Policy management controller 236 may coordinate interaction between web application 10 and, for example, other web applications 10, hardware, or modules. Policy management controller 236 may, for example, in a web application 10 coordinate, negotiate, and/or merge the policy criteria between web applications 10, between web application 10 and hardware (e.g., a printer), or within web application 10 (e.g., between policies in web application container 110 and user defined policies). Policy management controller 236 may, for example, include protocols for handling policy conflicts between web applications 10 or within a web application 10 (e.g., policies created during authoring, application container policies, application engine policies). Policy management controller 236 may, for example, negotiate web application 10 policy criteria or conformance policies and device (e.g., a printer) policy criteria or conformance policies and may determine common conformance policies which correspond to a minimum common factor between the web application conformance policies and the device conformance policies. The common conformance policies may, for example, be defined as the conformance policies used when web application 10 is used with the device. If use of web application 10 violates or does not conform to the common conformance policies, a module within web application 10 may be disabled, web application 10 may be disabled, execution of web application may be terminated, and/or a message may be output to a user.

Policy management controller 236 may, for example, negotiate policy criteria by using a first handshake system or approach. For example, a device (e.g., a printer) may include a set of policies and web application 10 may include another set of policies. Policy management controller 236 may determine a minimum common factor between the two sets of policies. The minimum common factor may be defined as the policy criteria to be used when web application 10 interfaces with the device. Minimum common factor conformance policies may be the conformance policies which least conflict with or best satisfy the policy criteria of two or more web applications 10, an application 10 and a device (e.g., a printer), and/or different modules within a web application (e.g., web application container 110 and user defined policies).

Figure 4:
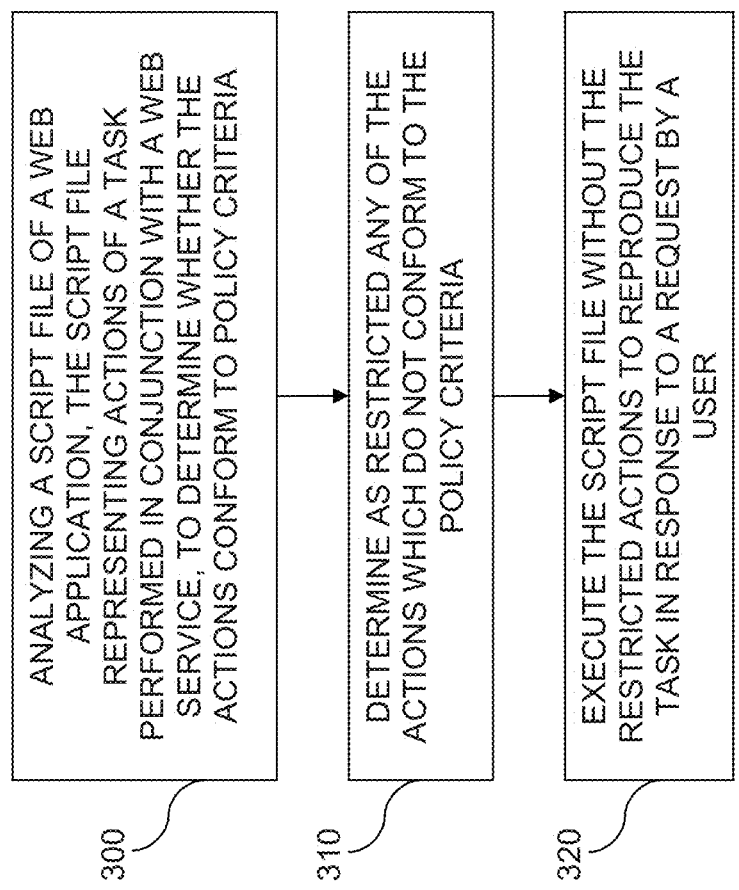
FIG. 4 is a flowchart of a process according to embodiments of the present invention.

FIG. 4 is a flowchart of a process according to embodiments of the present invention. In operation 300, a script file (e.g., script file 60 in FIG. 1) of a web application (e.g. web application 10 in FIG. 1), the script file representing actions of a task (e.g., user actions 30 in FIG. 1) performed in conjunction with a web service, may be analyzed to determine whether the actions conform to policy criteria (e.g., policy criteria 140 of FIG. 2 or policy criteria 140 of FIG. 3). Policy criteria or conformance policies may, for example, include a list of allowed websites, disallowed websites, policy criteria based on policy requirements of a web application repository (e.g., application repository 150 of FIG. 2), policy criteria associated with a printer (e.g., printer 170 of FIG. 2), mobile device (e.g., mobile device 160 of FIG. 2), or other device executing the web application. An instruction set (e.g., instruction set 50 of FIG. 1) and parameters (e.g., parameters 52 of FIG. 1) may be generated representing the actions of the user. The script file may, for example, be an automatically generated file (e.g., script file 60 in FIG. 1) created when the user performs actions in conjunction with a web browser (e.g., performs a programming-by-browsing operation).

In operation 310, actions which do not conform to the policy criteria may be determined to be restricted. For example, actions which include instructions and parameters which violate policy criteria may be restricted.

In operation 320, the script file may be executed without the restricted actions to reproduce the task in response to a request (e.g., request 122 of FIG. 3) by a user. The script file may be executed by a user from for example a printer (e.g., printer 170 of FIG. 3), mobile device (e.g., mobile device 160 of FIG. 3) or other device or module.

Embodiments of the present invention may include apparatuses for performing the operations described herein. Such apparatuses may be specially constructed for the desired purposes, or may comprise computers or processors selectively activated or reconfigured by a computer program stored in the computers. Such computer programs may be stored in a computer-readable or processor-readable non-transitory storage medium, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions. It will be appreciated that a variety of programming languages may be used to implement the teachings of the invention as described herein. Embodiments of the invention may include an article such as a non-transitory computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method of performing policy conformance, the method being performed by a server and comprising:
receiving a request from a computing device operated by a user and remote from the server, the request being provided in response to the user initiating a web application on the computing device;
analyzing, with the server, a script file of the web application, the script file representing actions of a task performed in conjunction with a web service, to determine whether the actions conform to policy criteria, the policy criteria including policy criteria based on a type of computing device accessing the web application;
determining, with the server, that one or more actions do not conform to the policy criteria, the one or more actions being identified as being restricted; and
executing the script file without the restricted one or more actions to provide information corresponding to the task to the computing device.

2. The method of claim 1, wherein the script file representing actions of a task performed in conjunction with a web service comprises an instruction set and parameters representing the actions of the user performing a task in conjunction with a web service.

3. The method of claim 1, wherein the policy criteria further comprise a list of disallowed websites.

4. The method of claim 1, wherein the policy criteria further comprise policy criteria based on policy requirements of a web application repository, and wherein analyzing the script file of the web application includes retrieving the script file from the web application repository.

5. The method of claim 1, wherein:
analyzing the script file of the web application to determine whether the actions conform to policy criteria comprises comparing instructions and parameters in the script file to policy criteria in a web application container; and
determining that one or more actions do not conform to the policy criteria comprises determining that one or more instructions and one or more parameters do not conform to policy criteria in the web application container.

6. The method of claim 1, wherein:
analyzing the script file of the web application to determine whether the actions conform to policy criteria comprises comparing instructions and parameters that represent the actions of a user to the policy criteria; and
determining that one or more actions do not conform to the policy criteria comprises determining that one or more instructions and one or more parameters do not conform to the policy criteria.

7. The method of claim 1, wherein the policy criteria comprise policy criteria defined by a developer of the web application during creation of the web application.

8. The method of claim 1, wherein the policy criteria comprise policy criteria associated with a printer that accesses the web application.

9. A system comprising:
a memory; and
a processor coupled to the memory, the processor to:
receive a request from a computing device operated by a user and remote from the system, the request being provided in response to the user initiating a web application on the computing device;
analyze a script file of the web application, the script file representing actions of a task performed in conjunction with a web service, to determine whether the actions conform to conformance policies, the conformance policies including a policy based on a type of computing device accessing the web application;
determine that one or more actions do not conform to the conformance policies, the one or more actions being identified as being restricted; and
execute the script file without the restricted one or more actions to provide information corresponding to the task to the computing device.

10. The system of claim 9, wherein the script file representing actions of the task performed in conjunction with the web service comprises an automatically generated file created when the user performs a programming-by-browsing operation.

11. The system of claim 9, wherein the conformance policies further comprise a list of allowed websites.

12. The system of claim 9, wherein the processor:
analyzes the script file of the web application to determine whether the actions conform to conformance policies by comparing instructions and parameters in the script file to conformance policies in a web application container; and determines that one or more actions do not conform to the conformance policies by determining that one or more instructions and one or more parameters in the script file do not conform to conformance policies in the web application container.

13. The system of claim 9, wherein the processor:
analyzes the script file of the web application to determine whether the actions conform to conformance policies by comparing instructions and parameters which represent the actions of a user to the conformance policies; and
determines that one or more actions do not conform to the conformance policies by determining which instructions and parameters in the script file violate the conformance policies.

14. The system of claim 9, wherein the conformance policies comprise conformance policies defined by a developer of the web application during creation of the web application.

15. The system of claim 9, the processor:
negotiates web application conformance policies and device conformance policies;
determines common conformance policies which correspond to a minimum common factor between the web application conformance policies and the device conformance policies; and
defines the conformance policies as the common conformance policies.

16. A non-transitory computer-readable medium storing instructions that, when executed by a processor, cause the processor to perform a method comprising:
negotiating web application conformance policies and device conformance policies;
determining common conformance policies which correspond to a minimum common factor between the web application conformance policies and the device conformance policies;
analyzing a script file of a web application, the script file representing actions of a task performed in conjunction with a web service, to determine whether the actions conform to the common conformance policies;
determining that one or more actions do not conform to the common conformance policies, the one or more actions being identified as being restricted; and
executing the script file without the restricted actions to reproduce the task in response to a request initiated on a computing device by a user.

17. The non-transitory computer-readable medium of claim 16, wherein the script file comprises an instruction set and parameters representing the actions of the user performing a task in conjunction with a web service.

18. The non-transitory computer-readable medium of claim 16, wherein the instructions cause the processor to (i) analyze the script file by comparing instructions and parameters that represent the actions of a user to the common conformance policies, and (ii) determine that one or more actions do not conform to the policy criteria by determining that one or more instructions and one or more parameters do not conform to the common conformance policies.

19. The non-transitory computer-readable medium of claim 16, wherein the instructions cause the processor to analyze the script file of the web application by retrieving the script file from a web application repository based on an identifier of the web application.

20. The method of claim 1, wherein the policy criteria includes policy criteria based on one or more web application conformance policies and one or more device conformance policies.

* * * * *